(12) United States Patent
Takeda et al.

(10) Patent No.: US 9,785,001 B2
(45) Date of Patent: *Oct. 10, 2017

(54) LIQUID CRYSTAL DISPLAY APPARATUS

(71) Applicant: Japan Display Inc., Minato-ku (JP)

(72) Inventors: Arihiro Takeda, Saitama (JP); Jin Hirosawa, Saitama (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,662

(22) Filed: Jul. 21, 2016

(65) Prior Publication Data

US 2016/0327829 A1    Nov. 10, 2016

Related U.S. Application Data

(60) Continuation of application No. 14/472,884, filed on Aug. 29, 2014, now Pat. No. 9,429,783, which is a
(Continued)

(30) Foreign Application Priority Data

Sep. 30, 2009 (JP) ................................ 2009-227915

(51) Int. Cl.
G02F 1/1343 (2006.01)
G02F 1/1333 (2006.01)
G02F 1/1337 (2006.01)

(52) U.S. Cl.
CPC .. G02F 1/133345 (2013.01); G02F 1/133371 (2013.01); G02F 1/133707 (2013.01);
(Continued)

(58) Field of Classification Search
None
See application file for complete search history.

(56) References Cited

U.S. PATENT DOCUMENTS 6,507,383 B1  1/2003  Abe et al.
7,110,063 B2  9/2006  Takeda et al.
(Continued)

FOREIGN PATENT DOCUMENTS

JP  2003-156731  5/2003
JP  2005-173037  6/2005

OTHER PUBLICATIONS

Office Action issued Feb. 5, 2013 in Japanese Patent Application No. 2009-227915 (with English language translation).

*Primary Examiner* — Tina Wong
(74) *Attorney, Agent, or Firm* — Oblon, McClelland, Maier & Neustadt, L.L.P.

(57) ABSTRACT

According to one embodiment, a liquid crystal display apparatus includes a first substrate including a first electrode and an insulating layer arranged so as to cover an edge of the first electrode, a second substrate including a second electrode facing the first electrode and a second slit from which the second electrode is removed, and a liquid crystal layer interposed between the first substrate and the second substrate. The first electrode includes a plurality of first slits extending inwardly from the edge of the first electrode. The insulating layer and the plurality of first slits are arranged such that a position of an end of the insulating layer and a position of a tip to which the first slit extends are apart from each other in a region between the edge of the first electrode and the second slit in a direction in which the first slit extends.

20 Claims, 10 Drawing Sheets

Related U.S. Application Data division of application No. 12/882,608, filed on Sep. 15, 2010, now Pat. No. 8,842,246.

(52) U.S. Cl.
CPC .. *G02F 1/134309* (2013.01); *G02F 1/134327* (2013.01); *G02F 1/13439* (2013.01); *G02F 2201/123* (2013.01)

(56) References Cited

U.S. PATENT DOCUMENTS

| | | |
|---|---|---|
| 8,355,104 B2 | 1/2013 | Yoshida et al. |
| 8,810,759 B2 | 8/2014 | Yoshida et al. |
| 2006/0238687 A1 | 10/2006 | Su |
| 2009/0135322 A1 | 5/2009 | Kim |
| 2009/0262274 A1 | 10/2009 | Noda et al. |
| 2010/0321607 A1 | 12/2010 | Utsumi |

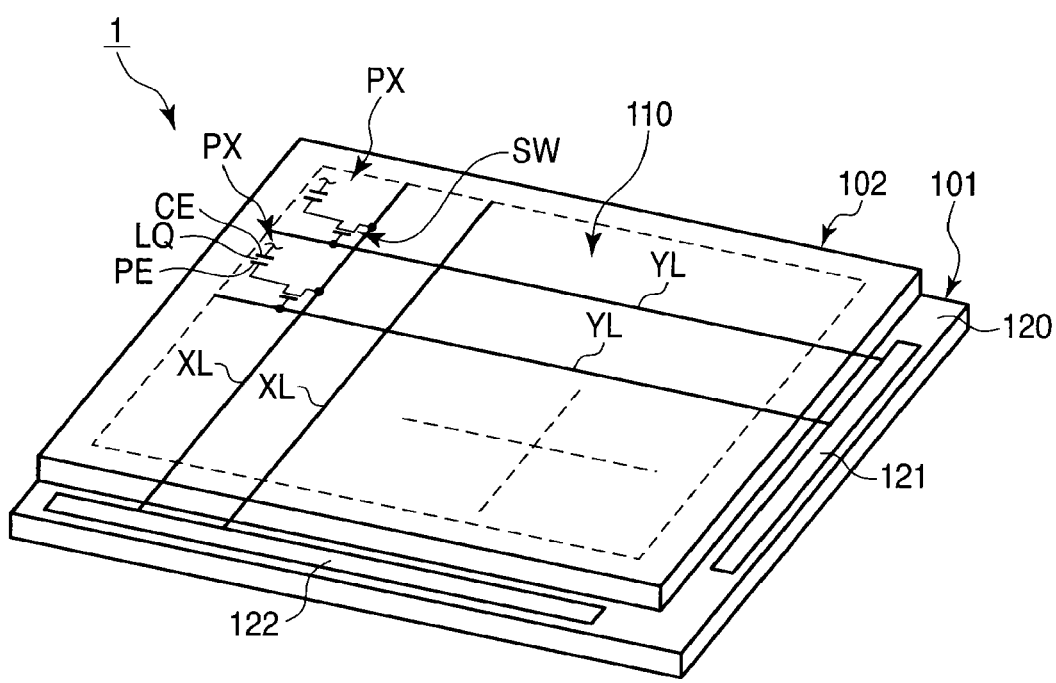
F I G. 1

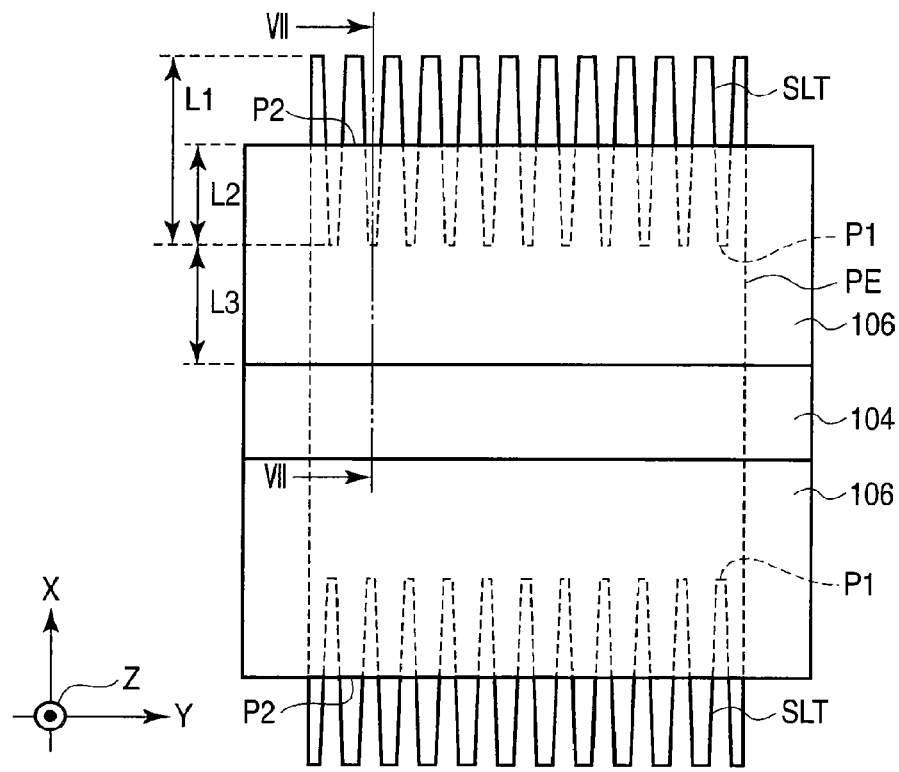
F I G. 6
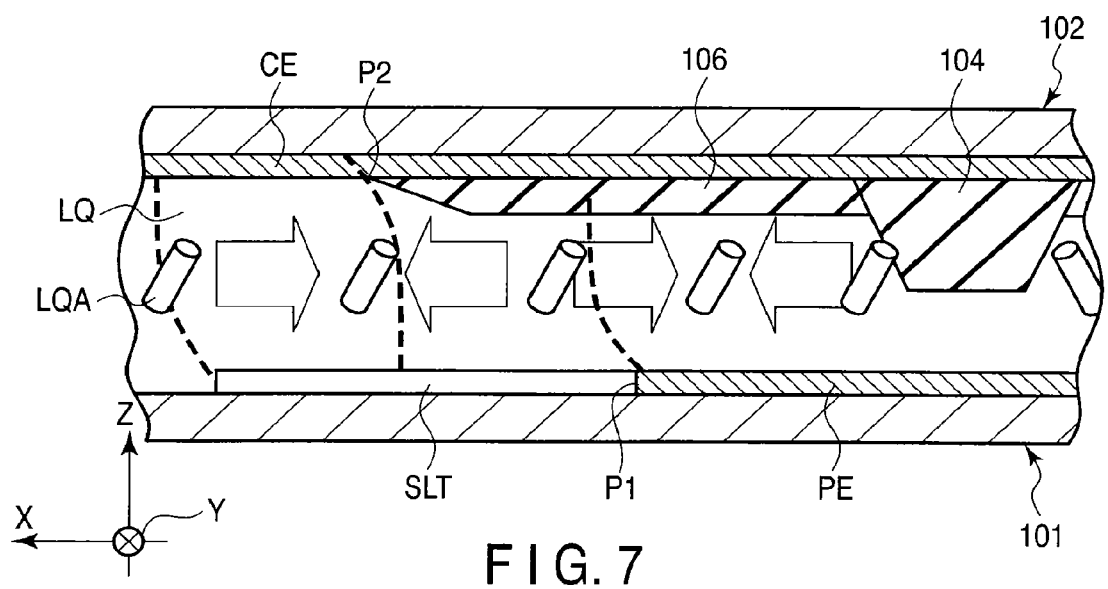
F I G. 7

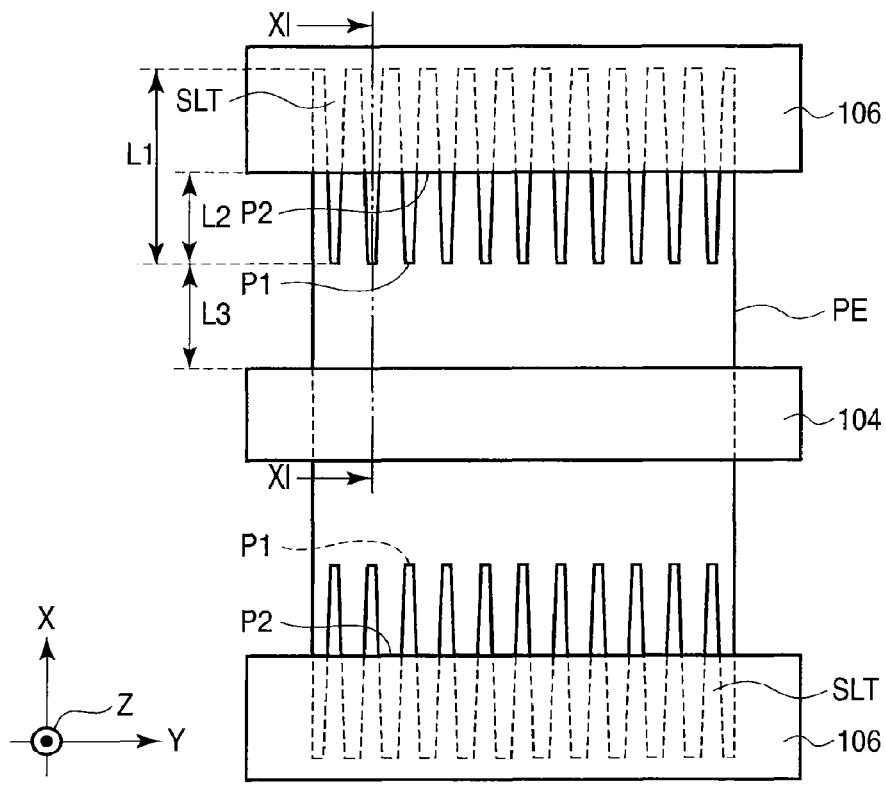
F I G. 10
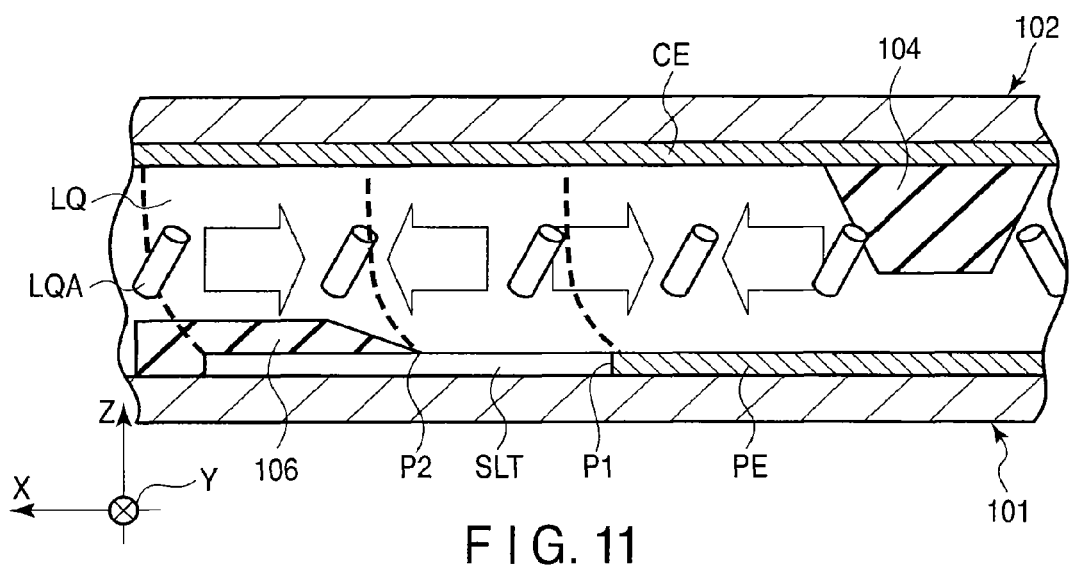
F I G. 11

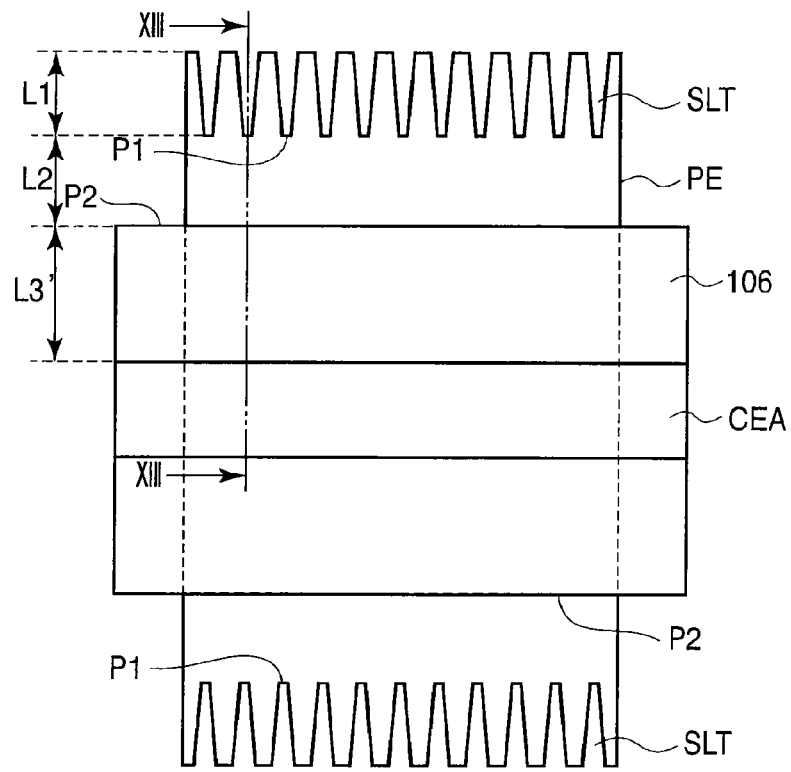
F I G. 12
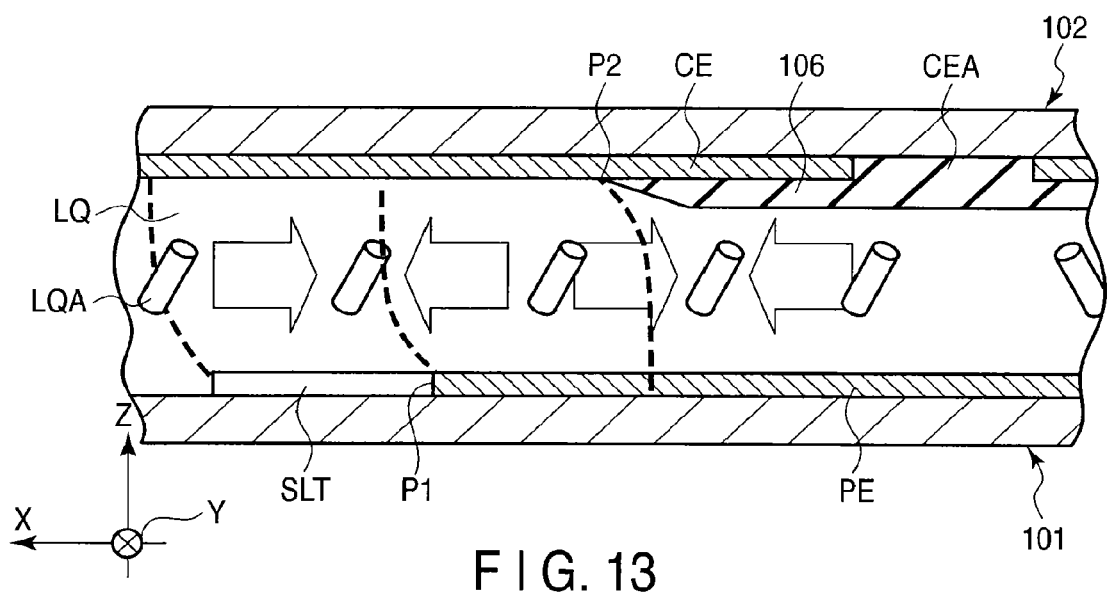
F I G. 13

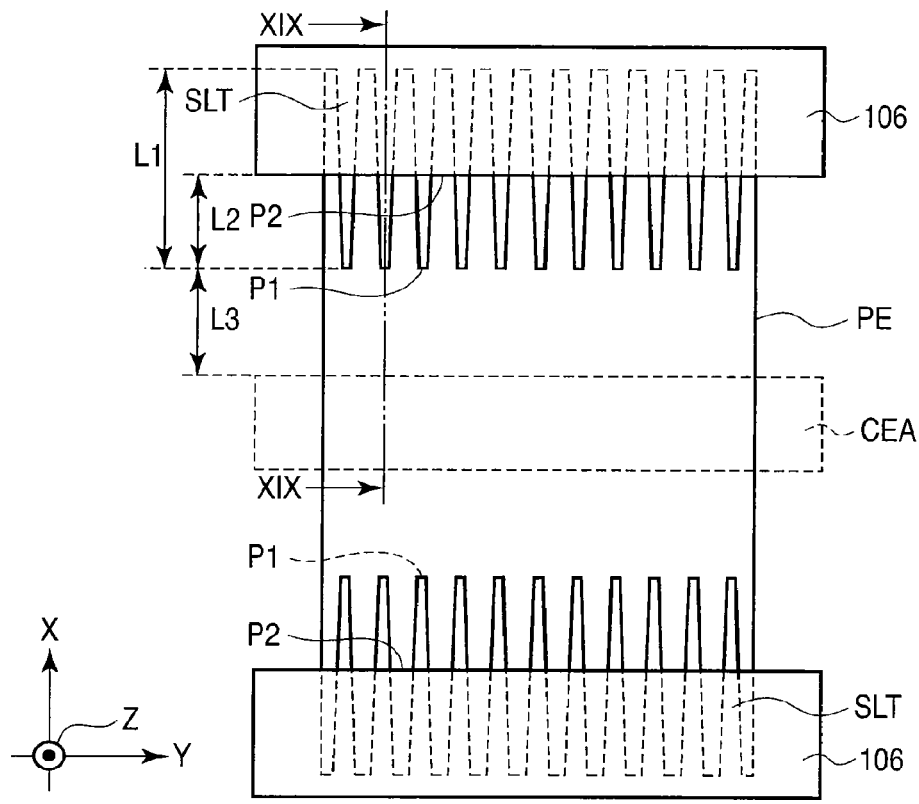
F I G. 18
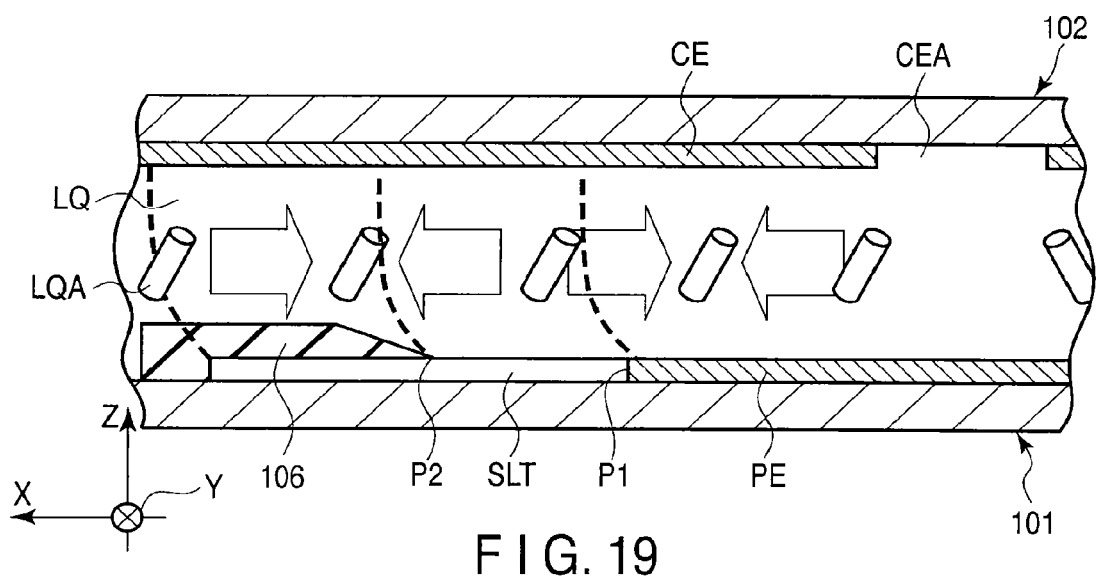
F I G. 19

LIQUID CRYSTAL DISPLAY APPARATUS

CROSS-REFERENCE TO RELATED APPLICATIONS

This application is a continuation of and claims the benefit of priority under 35 U.S.C. §120 from U.S. Ser. No. 14/472,884 filed Aug. 29, 2014, which is a division of U.S. Ser. No. 12/882,608 filed Sep. 15, 2010 (now U.S. Pat. No. 8,842,246 issued Sep. 23, 2014), and claims the benefit of priority under 35 U.S.C. §119 from Japanese Patent Application No. 2009-227915 filed Sep. 30, 2009; the entire contents of each of which are incorporated herein by reference.

FIELD

Embodiments described herein relate generally to a liquid crystal display apparatus.

BACKGROUND

A liquid crystal display (LCD) is a flat panel display that is currently used in the widest range of applications. Applications include large-screen televisions, personal computers, factory automation equipment, office automation equipment, cellular telephones, and the like.

Recently, LCDs have greatly advanced in display quality, and have reached a level equal to that of cathode ray tube (CRT) displays in terms of contrast and color reproduction when viewed from directly in front.

With respect to viewing angle and animation characteristics (response characteristics), however, problems still remain compared to CRT displays. From the viewpoint of improvement in viewing angle characteristics of LCDs, a liquid crystal display mode based on multi-domain vertical alignment (MVA) was developed. In this mode, orientation of liquid crystal molecules included in a liquid crystal layer is controlled using structures or electrode slits provided on a substrate.

More specifically, by arranging belt-shaped structures or electrode slits on surfaces of top and bottom substrates one after another, the liquid crystal orientation is divided into two directions between the structures or the electrode slits, and thereby liquid crystal domains oriented at the difference of approximately 180 degrees are formed and orientation division was achieved. The MVA mode greatly improved the viewing angle characteristics of LCDs, which were even achieved at a practically sufficient level.

In MVA-based LCDs, however, the response rate in the tones from black to gray is sometimes decreased, and improvement is required when it comes to application to television receivers or personal computers (PCs) for audio visuals.

In an MVA-based liquid crystal display apparatus, liquid crystal molecules are vertically oriented during an OFF voltage (black display), and is not equipped with a unit for inducing the liquid crystal molecules about the inclination direction through the process of rubbing an orientation film as in the twisted nematic (TN) technology or the homogeneous technology. In an MVA-based liquid crystal display apparatus, inclination information of liquid crystal molecules propagates from ribs (structures such as projections), electrode slits, or edges of pixel electrodes, and thereby liquid crystal molecules of the entire display region are operated.

Accordingly, since the voltage applied to a liquid crystal layer is small when switching is made from a high-tone display to a low-tone display, the propagation rate of inclination information of liquid crystal molecules is decreased, and the time required for response propagation of liquid crystal molecules is sometimes increased.

BRIEF DESCRIPTION OF THE DRAWINGS

FIG. 1 illustrates a configuration example of a liquid crystal display apparatus according to an embodiment;

FIG. 6 illustrates a configuration example of a display pixel of a liquid crystal display apparatus according to a second embodiment;

FIG. 7 illustrates an example of cross section along line VII-VII shown in FIG. 6;

FIG. 10 illustrates a configuration example of a display pixel of a liquid crystal display apparatus according to a fourth embodiment;

FIG. 11 illustrates a cross section along line XI-XI shown in FIG. 10;

FIG. 12 illustrates a configuration example of a display pixel of a liquid crystal display apparatus according to a fifth embodiment;

FIG. 13 illustrates an example of a cross section along line XIII-XIII shown in FIG. 12;

FIG. 18 is a configuration example of a display pixel of a liquid crystal display apparatus according to an eighth embodiment of; and FIG. 19 illustrates a cross section along line XIX-XIX shown in FIG. 18.

DETAILED DESCRIPTION

Figure 2:
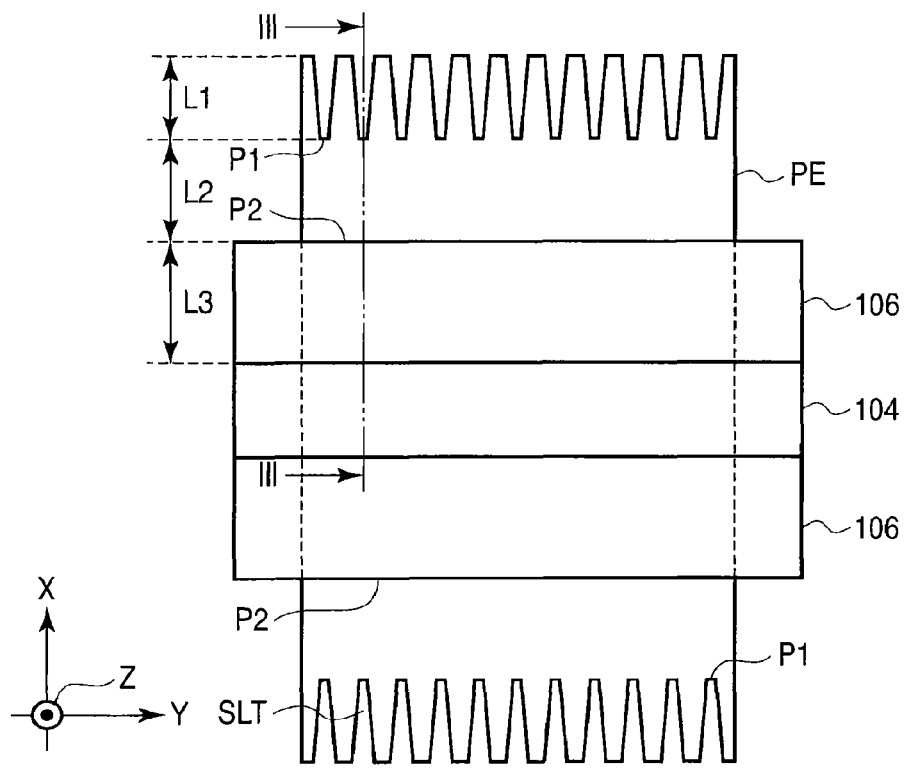
FIG. 2 illustrates a configuration example of a display pixel of a liquid crystal display apparatus according to a first embodiment.

In general, according to one embodiment, a liquid crystal display apparatus comprises a first substrate including a first electrode and an insulating layer arranged so as to cover an edge of the first electrode; a second substrate including a second electrode facing the first electrode and a second slit from which the second electrode is removed; and a liquid crystal layer interposed between the first substrate and the second substrate. The first electrode includes a plurality of first slits extending inwardly from the edge of the first electrode, and the insulating layer and said plurality of first slits are arranged such that a position of an end of the insulating layer and a position of a tip to which the first slit extends are apart from each other in a region between the edge of the first electrode and the second slit in a direction in which the first slit extends.

Hereinafter, a liquid crystal display apparatus according to a first embodiment of the present invention will be described with reference to the accompanying drawings. As shown in FIG. 1, a liquid crystal display apparatus 1 includes an array substrate (first substrate) 101 and an opposite substrate 102 arranged so as to face each other, a liquid crystal layer LQ interposed between the array substrate 101 and the opposite substrate 102, and a display module 110 including a plurality of display pixels PX arranged in a matrix.

The array substrate 101 includes a plurality of pixel electrodes (first electrodes) PE arranged on a transparent substrate (not shown) via an insulating layer (not shown) and a conductive layer, a scanning line YL extending approximately in parallel to the line direction in which the display pixels PX are arranged in the display module 110 and arranged in a region surrounding the pixel electrodes PE, and a signal line XL arranged so as to extend approximately in parallel to the row direction in which the display pixels PX are arranged.

The pixel electrode PE is formed of a transparent conductive material, such as indium tin oxide (ITO), and is arranged in each of the display pixels PX. The pixel electrodes PE are covered with an orientation film (not shown). The pixel electrode PE has a width of 90 µm, for example, in its longitudinal direction (X-direction shown in FIGS. 2 and 3), and has a width of 25 to 30 µm, for example, in the direction approximately crossing the longitudinal direction.

The scanning line YL is connected to a scanning line driving circuit 121 arranged outside the display module 110. The signal line XL is connected to the signal line driving circuit 122 arranged outside the display module 110.

In each of the display pixels PX, a pixel switch SW is arranged in the vicinity of the position at which the scanning line YL and the signal line XL cross. The pixel switch SW includes a thin-film transistor, for example, as a switching element. A gate electrode of the pixel switch SW is electrically connected to (or is integrally formed with) a corresponding scanning line YL. A source electrode of the pixel switch SW is electrically connected to (or integrally formed with) a corresponding signal line XL. The drain electrode of the pixel switch SW is electrically connected to (or integrally formed with) the pixel electrode PE.

When the scanning line driving circuit 121 selects a scanning line YL, a source-drain path of the pixel switch SW is brought into conduction, and a video signal is applied to the pixel electrode PE from a corresponding signal line XL via the pixel switch SW.

The opposite substrate 102 includes a color filter arranged on an upper layer of a transparent substrate (not shown), an opposite electrode (second electrode) CE (second electrode) arranged on the upper layer of the color filter so as to face the pixel electrodes PE, and an orientation film (not shown) covering the opposite electrode CE. An opposite voltage is supplied to the opposite electrode CE from an opposite electrode driving circuit, not shown.

The array substrate 101 and the opposite substrate 102 are fixed such that the orientation films face each other, and a polarization plate (not shown) is attached to the outside of the array substrate 101 and the opposite substrate 102. The liquid crystal layer LQ is formed of a liquid crystal material having negative dielectric constant anisotropy.

The liquid crystal display apparatus of the present embodiment is a liquid crystal display apparatus of the vertically aligned (VA) mode, in which liquid crystal molecules included in the liquid crystal layer LQ are arranged in an approximately vertical direction with respect to the substrate surface of the array substrate 101 and the opposite substrate 102 when a voltage is not applied, and are arranged approximately in parallel to the substrate surface of the array substrate 101 and the opposite substrate 102 when a predetermined voltage is applied.

Figure 3:
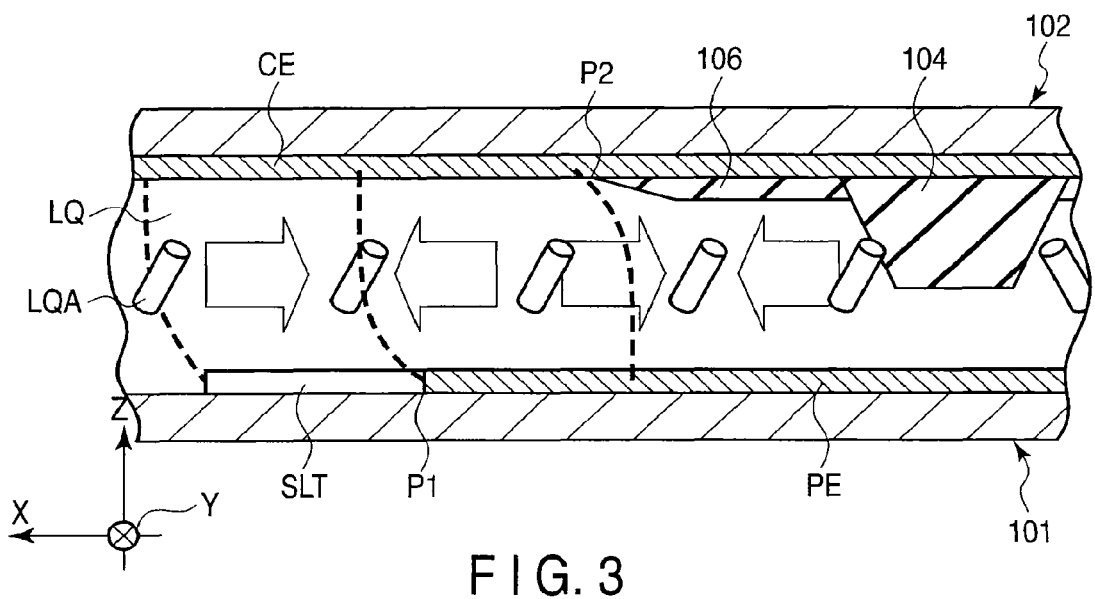
FIG. 3 illustrates an example of a cross section of line III-III shown in FIG. 2.

As shown in FIGS. 2 and 3, in the liquid crystal display apparatus according to the present embodiment, an insulating body facing the pixel electrode PE is arranged on the opposite electrode CE, and the pixel electrode PE includes a slit SL.

The insulating body includes a rib 104 extending in a direction (Y-direction) approximately crossing the longitudinal direction (X-direction) of the pixel electrode PE, and an insulating layer 106 arranged so as to interpose the rib 104 in the longitudinal direction (X-direction) of the pixel electrode PE. The rib 104 is a ribbed projection extending in the Y-direction, and faces a center portion of the pixel electrode PE in the X-direction. An end of the side apart from the rib 104 of the insulating layer 106 is formed such that its thickness (width in the Z-direction) gradually decreases in the X-direction.

In the case shown in FIG. 3, an end of the insulating layer 106 and an end of the rib 104 vary in thickness such that its inclination surface (surface on which the liquid crystal layer LQ contacts via the orientation film) makes an acute angle in a clockwise direction with respect to the substrate surface of the opposite substrate 102, and a distance from the top surface of the opposite electrode CE to the inclination surface gradually decreases toward the insulating layer 106 or the edge of the rib 104.

In the thickness direction (Z-direction) of the liquid crystal display apparatus 1, the thickness of the insulating layer 106 is smaller than the thickness of the rib 104. In the case shown in FIG. 3, the thickness of the insulating layer 106 in the Z-direction is approximately ⅓ to ⅔ of the thickness of the rib 104. For example, the thickness of the Z-direction of the liquid crystal layer LQ is approximately 3 to 3.5 µm, the thickness of the rib 104 is approximately 1.5 µm, and the thickness of the insulating layer 106 is 0.5 µm to 1.0 µm.

The slit SLT of the pixel electrode PE extends in the X-direction from an edge extending in the direction (Y-direction) approximately crossing the longitudinal direction (X-direction) of the pixel electrode PE. The width of the slit SLT in the Y-direction is approximately 5 µm. The pixel electrode PE has an approximately rectangular shape including two edges extending in the X-direction and two edges extending in the Y-direction. The edge extending in the Y-direction of the pixel electrode PE extends discontinuously from the slit SLT.

In the longitudinal direction (X-direction) of the pixel electrode PE, the insulating layer 106 and the slits SLT are arranged in a region between the edge of the pixel electrode PE and the end of the rib 104, such that the position of an edge P2 of the insulating layer 106 and the position of a tip P1 to which the slit SLT extends are apart from each other. In the liquid crystal display apparatus according to the present embodiment, the edge P2 of the insulating layer 106 and the tip P1 to which the slit SLT extends are arranged in this order from the position in which the rib 104 is arranged toward the edge of the pixel electrode PE, with respect to the X-direction.

The rib 104, the slit SLT, and the insulating layer 106 are arranged such that a distance L1 from the edge of the pixel electrode PE extending in the Y-direction, a distance L2 from the tip of the slit SLT to the end of the insulating layer 106, and a distance L3 from the end of the insulating layer 106 to the rib 104 become approximately equal.

Figure 4:
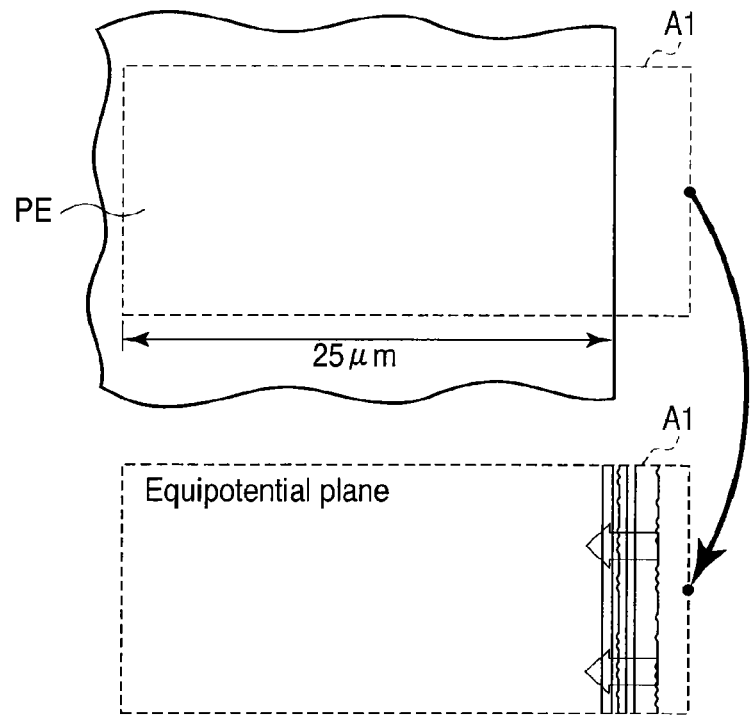
FIG. 4 illustrates an example of a simulation result of an equipotential plane in the vicinity of an edge of a pixel electrode.
Figure 5:
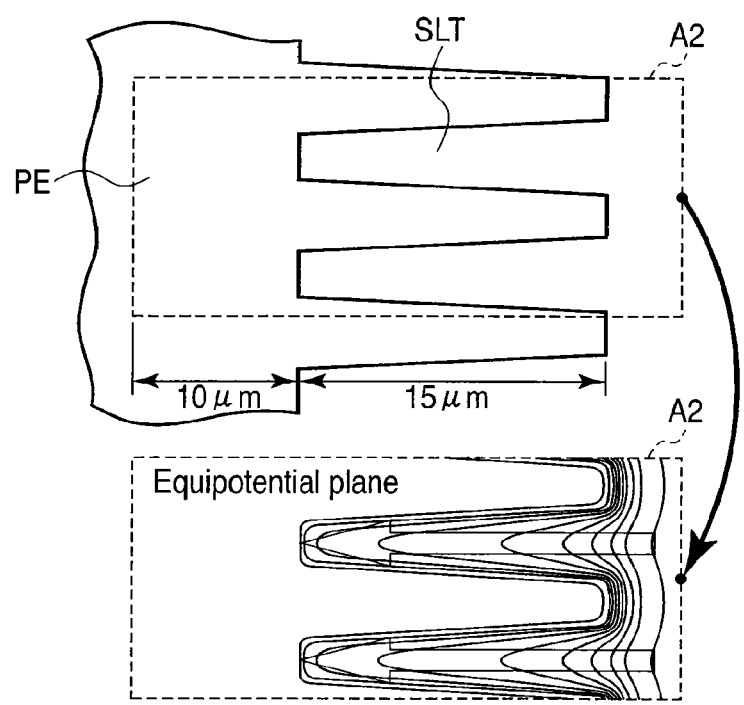
FIG. 5 illustrates an example of a simulation result of an equipotential plane in the vicinity of an edge of a pixel electrode.

FIGS. 4 and 5 show an example of a result obtained by simulating the potential in the vicinity of the edge of the pixel electrode PE in which the slit SLT is not provided and the potential of the pixel electrode PE in which the slit SLT is provided. By measuring the potential in the vicinity of the edge of the pixel electrode PE in which the slit SLT is not provided, an equipotential plane shown in FIG. 5 is formed.

In the case shown in FIG. 4, inclination of the potential is caused only in the vicinity of the edge of the pixel electrode PE. On the other hand, in the case shown in FIG. 5, inclination of the potential is caused in the position of the edge of the slit SLT too. Accordingly, when the slit SLT is provided in the pixel electrode PE, an originating point from which the liquid crystal molecules LQA are inclined is caused in the vicinity of the edge of the pixel electrode PE and the edge P1 of the slit SLT.

Similarly, inclination of the potential is caused in the vicinity of the inclined end of the rib 104 and the insulating layer 106. Accordingly, an originating point from which the liquid crystal molecules LQA are inclined is caused in the vicinity of the end of the rib 104 and the end of the insulating layer 106.

Accordingly, in the liquid crystal display apparatus 1 according to the present embodiment, the originating point P1 of inclination of the liquid crystal molecules LQA due to distortion in electric field in the vicinity of the tip of the slit SLT and the originating point P2 of the inclination of the liquid crystal molecules LQA at the end of the insulating layer 106 are generated in different positions in the X-direction.

Thereby, inclination of the liquid crystal molecules LQA propagates from the tip P1 of the slit SLT and the edge P2 of the insulating layer 106, as well as from the edge of the pixel electrode PE and the end of the rib 104. Accordingly, when the slit SLT and the insulating layer 106 are arranged as in the liquid crystal display apparatus 1 of the present embodiment, the distance between the originating points of the inclination information propagation of the liquid crystal molecules LQA is decreased. Further, the insulating layer 106 makes it possible to form regions with different threshold voltages for orienting the liquid crystal molecules LQA in the display pixel PX. By providing regions with different threshold voltages in the display pixel PX and through the action of the slit SLT, orientation of the liquid crystal molecules LQA in an arbitrary place in the display pixel PX can be uniformly determined.

As a result thereof, as shown by the arrows in FIG. 3, inclination information of the liquid crystal molecules LQA propagates throughout the display pixel PX from the originating point of the inclination information propagation of the liquid crystal molecules LQA, and thereby the response time of the liquid crystal molecules LQA is decreased.

In particular, since the originating point of the inclination information propagation of the liquid crystal molecules LQA is provided in the region between the edge of the pixel electrode PE and the edge of the rib 104, the response time can be decreased with respect to the liquid crystal molecules LQA existing in positions apart from both of the edge of the pixel electrode PE and the rib 104 as well.

Accordingly, the response time of the liquid crystal molecules LQA is improved in an arbitrary tone display, including a gray level display. In particular, the response time required for switching from black display to low tones is greatly improved.

Conventionally, when the slit SLT and the insulating layer 106 are not provided, the maximum value of the response time of the liquid crystal molecules LQA at the time of change of tones was approximately 100 ms. By providing the slit SLT and the insulating layer 106 as described above, the maximum value of the response time of the liquid crystal molecules LQA when the tone changes has been improved to less than or equal to approximately 100 ms.

As described above, it is possible to increase the number of originating points from which the operation of inclining the liquid crystal molecules propagate, and in particular to greatly improve the response time at low tones. That is, according to the liquid crystal display apparatus according to the present embodiment, it is possible to improve delay in time required for response propagation of the liquid crystal molecules, and to provide a liquid crystal display apparatus excellent in display qualities.

When the rib 104 and the insulating layer 106 of the liquid crystal display apparatus according to the present embodiment are formed, the rib 104 and the insulating layer 106 may be either separately formed or integrally formed. The liquid crystal display apparatus 1 forms the pixel switch SW through a general process of repeating film formation and patterning, as in the process of forming a general active matrix element.

First, a film is formed with a predetermined thickness through sputtering using molybdenum, for example, on a transparent substrate of the array substrate 101, and the scanning line YL and the gate electrode of the pixel switch SW extending from the scanning line YL are patterned into a predetermined shape through photolithography.

Silicon dioxide or silicon nitride, for example, is formed thereon with a predetermined thickness so as to form a gate insulating film layer (not shown), and a semiconductor layer (not shown) of the switching element SW is provided thereon. A signal line XL formed of aluminum with a predetermined thickness, a drain electrode and a source electrode extending from the signal line XL, are formed thereon, and a pixel switch SW and necessary wirings and the like are formed.

After that, an interlayer insulating layer is formed, and a pixel electrode PE and a drain electrode of the pixel switch SW are formed through lithography by sputtering the ITO with a predetermined thickness. In that case, a slit SLT is also formed so as to extend in the X-direction from the edge of the pixel electrode PE.

A photosensitive resist including red pigments in a distributed manner is coated on the entire surface of the opposite substrate 102 using a spinner, and the substrate is exposed via a photomask that allows ultraviolet rays to be irradiated only on the portion in which a red layer is to be formed, after the substrate is dried. Next, the exposed colored layer is developed, and a red filter layer is formed by baking the developed layer.

Similarly, by repeatedly forming a green filter layer and a blue filter layer using a photosensitive resist including green and blue pigments in a distributed manner, color filter layers are obtained.

Further, a photosensitive black resin is applied on the substrate using a spinner, and the substrate is exposed via a photomask that lets ultraviolet rays to be irradiated between a spacer (not shown) and the display pixels PX, and on an outer peripheral portion of the display module 110 after being dried. After that, the substrate is developed using an alkaline aqueous solution, and a spacer and a light-shielding layer are patterned by burning the substrate.

Next, an opposite electrode CE is formed through ITO sputtering, for example. After that, an insulating material is applied on the opposite electrode CE with a predetermined thickness, so as to form a rib 104 and an insulating layer 106. In this case, the insulating material is applied on the end of the insulating layer 106 such that its thickness gradually decreases. After that, exposure and development is carried out via a predetermined photomask, and thereby the insulating layer 106 is formed. Similarly, an insulating material is applied with a predetermined thickness such that the thickness of the end gradually decreases, exposure and development is performed via a predetermined photomask, and thereby the rib 104 independent from the insulating layer 106 is formed.

When the rib 104 and the insulating layer 106 are integrally formed, a photosensitive insulating material is applied with a predetermined film thickness, and then the amount of exposure is adjusted when exposure is carried out.

After that, an orientation film indicating verticality is applied to each of the obtained array substrate 101 and opposite substrate 102 with a predetermined thickness, and an end surface of the array substrate 101 and the end surface of the opposite substrate 102 are attached with a jig, and bonded using an adhesive agent formed of an epoxy thermoset resin, for example.

After that, a liquid crystal material having negative dielectric constant anisotropy is charged into the cell and a liquid crystal layer LQ is formed, an inlet is sealed with an ultraviolet curable resin, a polarization plate is attached, and thereby a liquid crystal display apparatus 1 is manufactured.

The above-described liquid crystal display apparatus is merely an example, and the liquid crystal display apparatus according to the present embodiment may be manufactured by any manufacturing method including a step of forming the slit SLT in the pixel electrode PE and a step of forming the rib 104 and the insulating layer 106 on the opposite substrate 102.

Next, the liquid crystal display apparatus according to the second embodiment will be described with reference to the accompanying drawings. In the description that follows, structural elements same as those of the liquid crystal display apparatus 1 according to the present embodiment will be denoted by the same reference numerals, and detailed descriptions of such elements will be omitted.

The liquid crystal display apparatus 1 according to the present embodiment is different from the above-described liquid crystal display apparatus 1 according to the first embodiment in the configuration of the slit SLT of the pixel electrode PE and the insulating layer 106. As shown in FIGS. 6 and 7, the pixel electrode PE includes a plurality of slits SLT extending in the X-direction from an edge extending in a direction (Y-direction) approximately crossing its longitudinal direction (X-direction).

An insulating layer 106 is arranged on an opposite electrode CE. An end on the side apart from a rib 104 of the insulating layer 106 is configured such that its thickness (width in the Z-direction) gradually decreases in the X-direction.

In the case shown in FIG. 7, an end of the insulating layer 106 and an end of the rib 104 vary in thickness such that an inclination surface (surface contacting the liquid crystal layer LQ via an orientation film) makes an acute angle in a clockwise direction with respect to the substrate surface of the opposite substrate 102.

The insulating layer 106 and the slits SLT are arranged in a region between an edge of the pixel electrode PE in a direction (X-direction) in which the slit SLT extends and the position in which the rib 104 is arranged, such that the position of an end P2 of the insulating layer 106 and the position of a tip P1 to which the slit SLT extends are apart from each other.

In the liquid crystal display apparatus 1 according to the present embodiment, originating points from which the liquid crystal molecules LQA are inclined are arranged in the order of the tip P1 to which the slit SLT extends and the edge P2 of the insulating layer 106, from the position in which the rib 104 is arranged to the edge of the pixel electrode PE, with respect to the X-direction, as shown in FIGS. 6 and 7. Accordingly, the edge P2 of the insulating layer 106 faces a portion of the slit SLT in the Z-direction.

The rib 104, the slit SLT, and the insulating layer 106 are arranged such that a distance L1 from the edge of the pixel electrode PE along the Y-direction to the tip of the slit SLT is approximately double a distance L2 from the tip of the slit SLT to the end of the insulating layer 106, and a length obtained by subtracting distance L2 from distance L1 and a distance L3 from the end of the insulating layer 106 to the rib 104 become approximately equal.

By thus arranging the slit SLT and the insulating layer 106, an originating point P1 of inclination of the liquid crystal molecules LQA due to distortion in electric field in the vicinity of the tip of the slit SLT and an originating point P2 of the inclination operation of the liquid crystal molecules LQA at the end of the insulating layer 106 are generated in different positions with respect to the X-direction, as in the case of the above-described liquid crystal display apparatus 1 according to the first embodiment.

Thus, the inclination operation of the liquid crystal molecules LQA propagates from the tip P1 of the slit SLT and the edge P2 of the insulating layer 106, as well as from the edge of the pixel electrode PE and from the end of the rib 104. Accordingly, the distance between the originating points of the inclination operation propagation of the liquid crystal molecules LQA can be decreased.

As a result thereof, as shown by the arrows in FIG. 7, the inclination operation of the liquid crystal molecules LQA propagates throughout the display pixel PX from the originating point of the inclination operation propagation of the liquid crystal molecules LQA, and the response time of the liquid crystal molecules LQA is decreased.

Conventionally, when the tone is varied in the case where the slit SLT and the insulating layer 106 are not provided, the maximum value of the response time of the liquid crystal molecules LQA was approximately 200 ms. By providing the slit SLT and the insulating layer 106 as above, the maximum value of the liquid crystal molecules LQA when the tone varies has been improved to less than or equal to approximately 100 ms.

That is, according to the liquid crystal display apparatus 1 of the present embodiment, delay in time required for response propagation of liquid crystal molecules is improved, and a liquid crystal display apparatus excellent in display qualities is provided, as in the above-described liquid crystal display apparatus 1 according to the first embodiment.

In the above-described second embodiment, distance L1 from the edge of the pixel electrode PE extending in the Y-direction to the tip of the slit SLT in the X-direction is approximately double distance L2 from the tip of the slit SLT to the end of the insulating layer 106, but distance L1 is not limited thereto and may be varied as appropriate so as to obtain a desired value of the transmittance, the response time, and the like.

Next, the liquid crystal display apparatus 1 according to the third embodiment will be described with reference to the accompanying drawings. The liquid crystal display apparatus 1 of the present embodiment includes an array substrate 101 and an opposite substrate 102, as in the case of the above-described liquid crystal display apparatus 1 according to the first embodiment.

Figure 8:
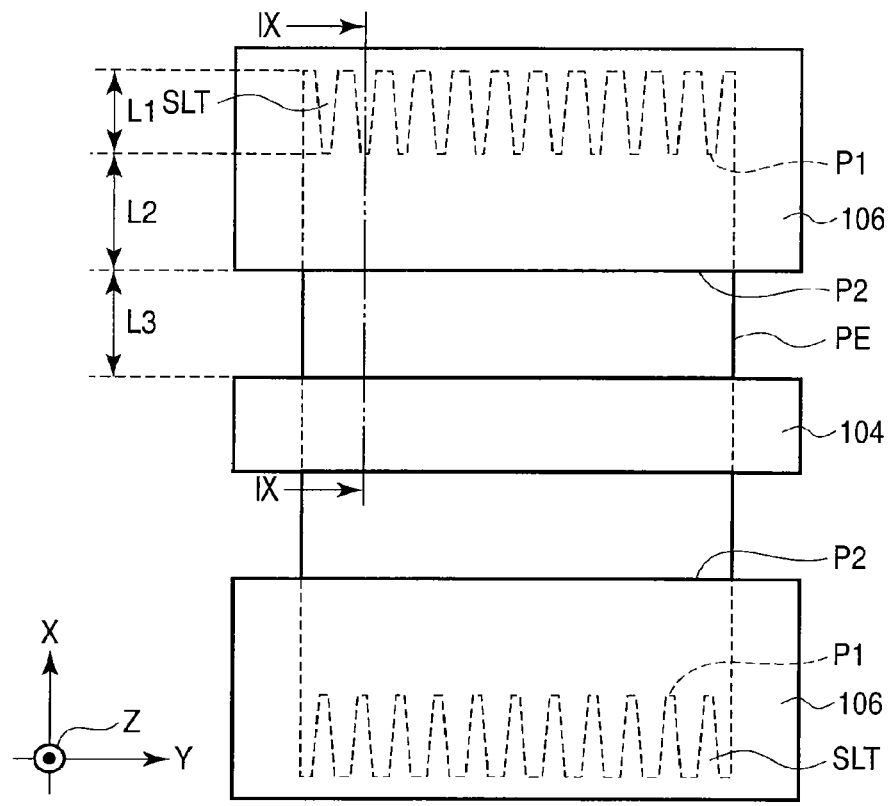
FIG. 8 illustrates a configuration example of a display pixel of a liquid crystal display apparatus according to a third embodiment.

In the liquid crystal display apparatus 1 according to the present embodiment, the configuration of the insulating layer 106 is different from that of the above-described liquid crystal display apparatus 1 according to the first embodiment. That is, as shown in FIGS. 8 and 9, the array substrate 101 includes an insulating layer 106 arranged on a pixel electrode PE.

The pixel electrode PE includes a plurality of slits SLT extending in the X-direction from an edge extending in a direction (Y-direction) approximately crossing its longitudinal direction (X-direction). An insulating layer 106 is arranged on the pixel electrode PE. The insulating layer 106 covers the slits SLT and the edge of the pixel electrode PE on which the slits SLT are provided.

The insulating layer 106 is positioned such that its end is positioned in a region between a position of a tip P1 to which the slit SLT extends in the X-direction and a position in which a rib 104 is arranged. The end arranged on the pixel electrode PE of the insulating layer 106 is configured such that its thickness (width in the Z-direction) gradually decreases in the X-direction.

Figure 9:
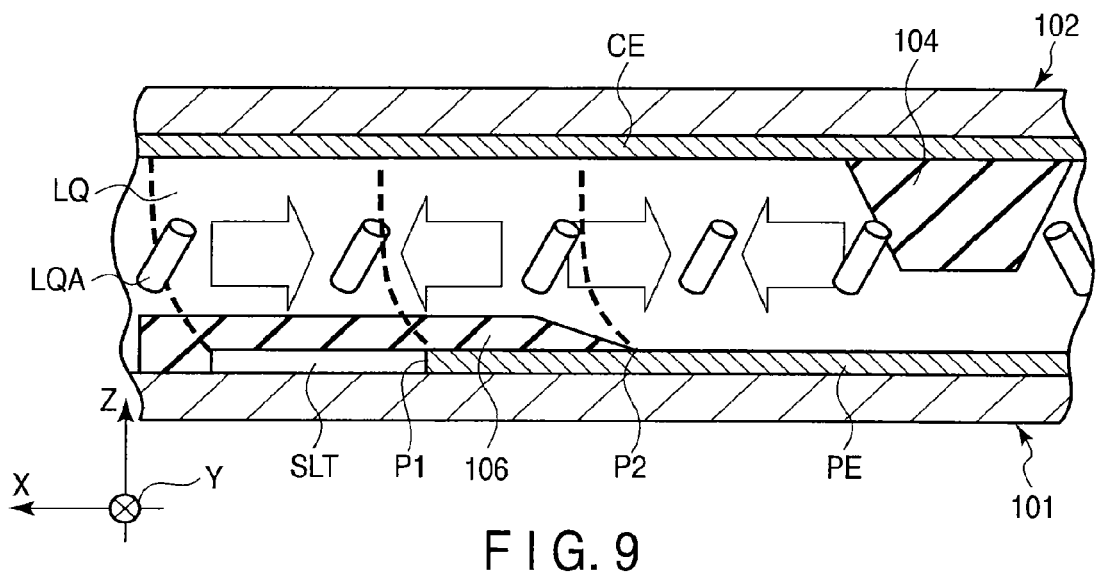
FIG. 9 illustrates an example of a cross section along line IX-IX shown in FIG. 8.

In the case shown in FIG. 9, the end of the insulating layer 106 and the end of the rib 104 vary in thickness such that the inclination surface (surface contacting the liquid crystal layer LQ via the orientation film) forms an acute angle in a clockwise direction with respect to the substrate surface.

In the present embodiment, the rib 104, the slit SLT, and the insulating layer 106 are arranged such that a distance L1 from the edge of the pixel electrode PE along the Y-direction to the tip of the slit SLT, a distance L2 from the tip of the slit SLT to the end P2 of the insulating layer 106, and a distance L3 from the end of the insulating layer 106 to the rib 104 become approximately equal.

By thus arranging the slit SLT and the insulating layer 106, an originating point P1 of inclination operation of the liquid crystal molecules LQA due to distortion in electric field in the vicinity of the tip of the slit SLT and an originating point P2 of inclination operation of the liquid crystal molecules LQA at the end of the insulating layer 106 are generated in different positions in the X-direction, as in the case of the above-described liquid crystal display apparatus 1 according to the first embodiment.

In the liquid crystal display apparatus according to the present embodiment, the edge P2 of the insulating layer 106 and the tip P1 to which the slit SLT extends are arranged in this order toward the edge of the pixel electrode PE from the position in which the rib 104 is arranged, with respect to the X-direction.

Thus, the inclination operation of the liquid crystal molecules LQA at the end of the insulating layer 106 propagate from the tip P1 of the slit SLT and the edge P2 of the insulating layer 106, as well as from the edge of the pixel electrode PE and from the end of the rib 104. Accordingly, the distance between the originating points of the inclination operation propagation of the liquid crystal molecules LQA can be decreased.

As a result thereof, as shown by the arrows in FIG. 9, the inclination operation of the liquid crystal molecules LQA propagate throughout the display pixel PX from the originating points of the inclination operation propagation of the liquid crystal molecules LQA, and the response time of the liquid crystal molecules LQA is decreased.

Conventionally, when the tone is varied in the case where the slit SLT and the insulating layer 106 are not provided, the maximum value of the response time of the liquid crystal molecules LQA was approximately 200 ms. By providing the slit SLT and the insulating layer 106 as above, the maximum value of the liquid crystal molecules LQA when the tone varies has been improved to less than or equal to approximately 100 ms.

That is, according to the liquid crystal display apparatus 1 of the present embodiment, delay in time required for response propagation of liquid crystal molecules is improved, and a liquid crystal display apparatus excellent in display qualities is provided, as in the above-described liquid crystal display apparatus 1 according to the first embodiment.

Next, the liquid crystal display apparatus 1 according to the fourth embodiment will be described with reference to the accompanying drawings. A liquid crystal display apparatus 1 of the present embodiment includes an array substrate 101 and an opposite substrate 102, as in the case of the above-described liquid crystal display apparatus 1 according to the first embodiment.

In the liquid crystal display apparatus 1 according to the present embodiment, the configuration of the insulating layer 106 is different from the above-described liquid crystal display apparatus 1 according to the first embodiment. That is, as shown in FIGS. 10 and 11, the array substrate 101 includes an insulating layer 106 arranged on the pixel electrode PE.

The pixel electrode PE includes a plurality of slits SLT extending in the X-direction from an edge extending in a direction (Y-direction) approximately crossing its longitudinal direction (X-direction). An insulating layer 106 is arranged on the pixel electrode PE. The insulating layer 106 covers the edge of the pixel electrode PE on which the slits SLT are provided.

In the present embodiment, a tip to which the slit SLT extends is arranged in a region between a position of an end of the insulating layer 106 arranged on the pixel electrode PE and a position in which a rib 104 is arranged. The end of the insulating layer 106 arranged on the pixel electrode PE is configured such that its thickness (width in the Z-direction) gradually decreases in the X-direction.

In the case shown in FIG. 11, the end of the insulating layer 106 and the end of the rib 104 vary in thickness such that the inclination surface (surface contacting the liquid crystal layer LQ via an orientation film) forms an acute angle in a clockwise direction with respect to the substrate surface of the opposite substrate 102.

In the present embodiment, the rib 104, the slit SLT, and the insulating layer 106 are arranged such that a distance L1 from the edge of the pixel electrode PE extending in the Y-direction to the tip of the slit SLT is approximately double a distance L2 from the tip of the slit SLT to the end P2 of the insulating layer 106, and a length obtained by subtracting distance L2 from distance L1, distance L2, and a distance L3 from the end of the insulating layer 106 to the rib 104 become approximately equal.

By thus arranging the slit SLT and the insulating layer 106, an originating point P1 of inclination of the liquid crystal molecules LQA due to distortion in electric field in the vicinity of the tip of the slit SLT and an originating point P2 of the inclination operation of the liquid crystal molecules at the end of the insulating layer 106 are generated in different positions with respect to the X-direction, as in the case of the liquid crystal display apparatus 1 according to the first embodiment.

In the liquid crystal display apparatus according to the present embodiment, the tip P1 to which the slit SLT extends and the edge P2 of the insulating layer 106 are arranged in this order toward the edge of the pixel electrode PE from the position in which the rib 104 is arranged, with respect to the X-direction.

Thus, the inclination operation of the liquid crystal molecules LQA propagates from the tip P1 of the slit SLT and the edge P2 of the insulating layer 106, as well as from the edge of the pixel electrode PE and from the end of the rib 104. Accordingly, the distance between the originating points of the inclination operation propagation of the liquid crystal molecules LQA can be decreased.

As a result thereof, as shown by the arrows in FIG. 11, the inclination operation of the liquid crystal molecules LQA propagates throughout the display pixel PX from the originating points of the inclination operation propagation of the liquid crystal molecules LQA, and the response time of the liquid crystal molecules LQA is decreased.

Conventionally, when the tone is varied in the case where the slit SLT and the insulating layer 106 are not provided, the maximum value of the response time of the liquid crystal molecules LQA was approximately 200 ms. By providing the slit SLT and the insulating layer 106 as above, the maximum value of the liquid crystal molecules LQA when the tone varies has been improved to less than or equal to approximately 100 ms.

That is, according to the liquid crystal display apparatus 1 of the present embodiment, delay in time required for response propagation of liquid crystal molecules is improved, and a liquid crystal display apparatus excellent in display qualities can be provided, as in the above-described liquid crystal display apparatus 1 according to the first embodiment.

Next, the liquid crystal display apparatus 1 according to the fifth embodiment will be described with reference to the accompanying drawings. A liquid crystal display apparatus 1 of the present embodiment includes an array substrate 101 and an opposite substrate 102, as in the case of the above-described liquid crystal display apparatus 1 according to the first embodiment. The array substrate 101 includes a pixel electrode PE. The opposite substrate 102 includes an opposite electrode CE facing the pixel electrode PE, a slit CEA from which the opposite electrode CE is removed, and an insulating layer 106 arranged so as to cover the slit CEA.

The pixel electrode PE includes a plurality of slits SLT extending inwardly from its edge. The insulating layer 106 and the slits SLT are arranged such that the position of the end P2 of the insulating layer 106 and the position of the tip P1 to which the slit SLT extends are apart from each other in the region between the edge of the pixel electrode PE and the slit CEA in a direction (X-direction) in which the slit SLT extends.

That is, in the liquid crystal display apparatus 1 of the present embodiment, the opposite substrate 102 does not include a rib, as shown in FIGS. 12 and 13. The opposite electrode CE includes a slit CEA from which the electrode is removed so as to extend in the Y-direction in the position facing the pixel electrode PE. The slit CEA is formed when the opposite electrode CE is patterned.

An insulating layer 106 is arranged on the opposite electrode CE so as to cover the slit CEA. The end of the insulating layer 106 is configured such that its thickness (width in the Z-direction) gradually decreases in the X-direction.

In the case shown in FIG. 13, the end of the insulating layer 106 varies in thickness such that the inclination surface (surface contacting the liquid crystal layer LQ via an orientation film) forms an acute angle in a clockwise direction with respect to the substrate surface of the opposite substrate 102.

In the present embodiment, the end P2 of the insulating layer 106 arranged on the opposite electrode CE is positioned in a region between the position of the end P1 to which the slit SLT extends and the position of the edge of the slit CEA extending in the Y-direction, with respect to the X-direction.

The slit CEA, the slit SLA, and the insulating layer 106 are arranged such that a distance L1 from the edge of the pixel electrode PE along the Y-direction to the tip of the slit SLT, a distance L2 from the tip of the slit SLT to the end P2 of the insulating layer 106, and a distance L3, from the end of the insulating layer 106 to the slit CEA become approximately equal.

By thus providing the slit CEA instead of the rib 104 and arranging the slit SLT and the insulating layer 106, an originating point P1 of an inclination operation of the liquid crystal molecules LQA due to distortion in electric field in the vicinity of the tip of the slit SLT and an originating point P2 of the inclination operation of the liquid crystal molecules LQA at the end of the insulating layer 106 are generated in different positions in the X-direction, as in the case of the liquid crystal display apparatus 1 according to the first embodiment.

In the liquid crystal display apparatus according to the present embodiment, the edge P2 of the insulating layer 106 and the tip P1 to which the slit SLT extends are arranged in this order toward the edge of the pixel electrode PE from the position in which the rib 104 is arranged, with respect to the X-direction.

Thereby, the inclination operation of the liquid crystal molecules LQA propagates from the tip P1 of the slit SLT and the edge P2 of the insulating layer 106, as well as from the edge of the pixel electrode PE and the end of the rib 104. Accordingly, the distance between the originating points of the inclination operation propagation of the liquid crystal molecules LQA can be decreased.

As a result thereof, as shown by the arrows in FIG. 13, the inclination operation of the liquid crystal molecules LQA propagates throughout the display pixel PX from the originating points of the inclination operation propagation of the liquid crystal molecules LQA, and the response time of the liquid crystal molecules LQA is decreased.

Conventionally, when the tone is varied in the case where the slit SLT and the insulating layer 106 are not provided, the maximum value of the response time of the liquid crystal molecules LQA was approximately 200 ms. By providing the slit SLT and the insulating layer 106 as above, the maximum value of the liquid crystal molecules LQA when the tone varies has been improved to less than or equal to approximately 100 ms.

That is, according to the liquid crystal display apparatus 1 of the present embodiment, delay in time required for response propagation of liquid crystal molecules is improved, and a liquid crystal display apparatus excellent in display qualities is provided, as in the above-described liquid crystal display apparatus 1 according to the first embodiment.

Next, a liquid crystal display apparatus according to the sixth embodiment of will be described with reference to the accompanying drawings. The liquid crystal display apparatus 1 according to the present embodiment comprises an array substrate 101 and an opposite substrate 102, as in the case of the liquid crystal display apparatus 1 according to the above-described first embodiment. The array substrate 101 includes a pixel electrode PE. The opposite substrate 102 includes an opposite electrode CE facing the pixel electrode PE, a slit CEA from which the opposite electrode CE is removed, and an insulating layer 106 arranged so as to cover the slit CEA.

The pixel electrode PE includes a plurality of slits SLT extending inwardly from the edge thereof. The insulating layer 106 and the slits SLT are arranged such that the position of the end P2 of the insulating layer 106 and the position of the tip P1 to which the slit SLT extends are apart from each other, in a region between the edge of the pixel electrode PE in the direction (X-direction) in which the slit SLT extends and the position in which the rib 104 is arranged.

Figure 14:
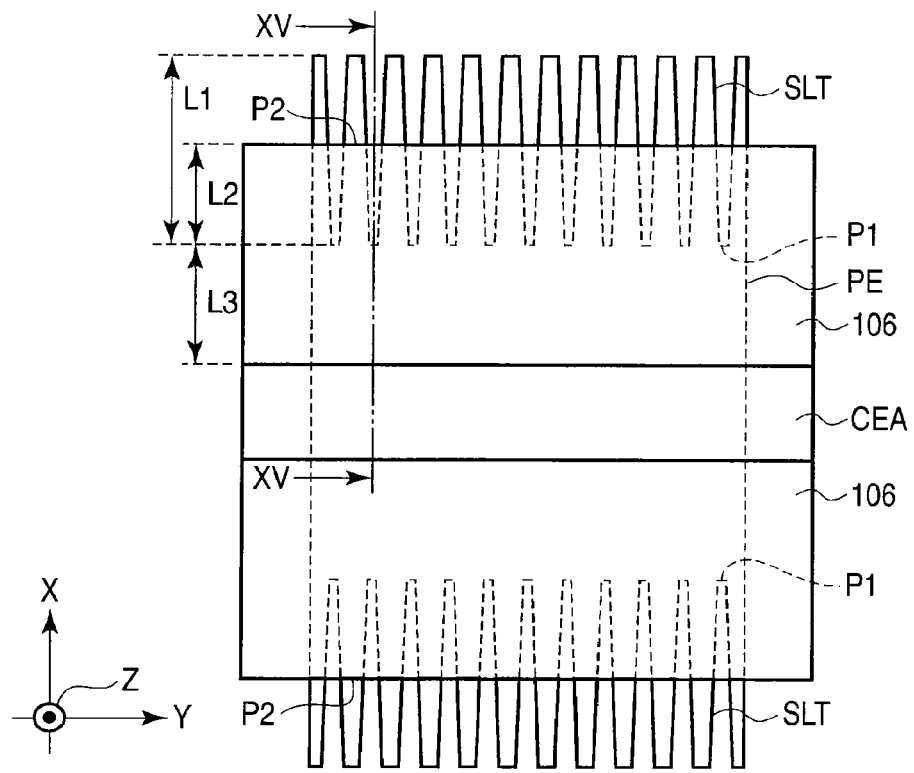
FIG. 14 illustrates a configuration example of a display pixel of a liquid crystal display apparatus according to a sixth embodiment.
Figure 15:
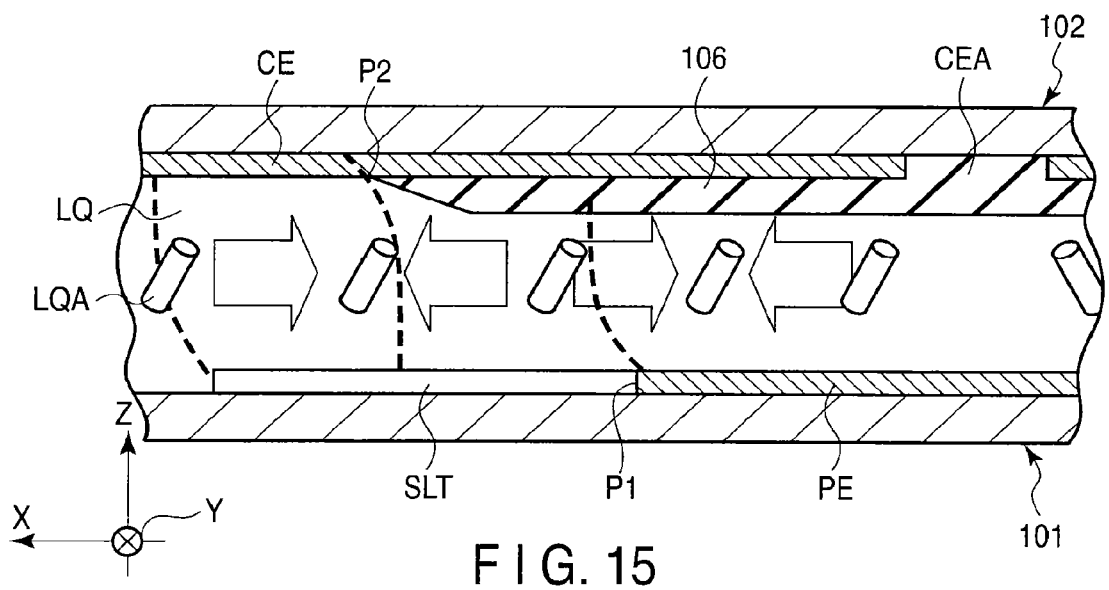
FIG. 15 illustrates a cross section along line XV-XV shown in FIG. 14.

That is, in the liquid crystal display apparatus 1 of the present embodiment, the opposite substrate 102 does not include a rib, as shown in FIGS. 14 and 15. The opposite electrode CE includes the slit CEA from which the electrode is removed so as to extend in the Y-direction in a position facing the pixel electrode PE. The slit CEA is formed when the opposite electrode CE is patterned.

The insulating layer 106 is arranged on the opposite electrode CE so as to cover the slit CEA. The end of the insulating layer 106 is configured such that the thickness (width in the Z-direction) gradually decreases in the X-direction.

In the case shown in FIG. 15, the end of the insulating layer 106 varies in thickness such that an inclination surface (surface contacting the liquid crystal layer LQ via an orientation film) forms an acute angle in a clockwise direction with respect to the substrate surface of the opposite substrate 102.

In the present embodiment, an end P2 of the insulating layer 106 arranged on the opposite electrode CE is positioned in a region between a position of the edge P1 to which the slit SLT extends and a position of the edge extending in the Y-direction of the slit CEA.

The slit CEA, the slit SLA, and the insulating layer 106 are arranged such that a difference (L1−L2) between a distance L1 from the edge of the pixel electrode PE along the Y-direction to the tip P1 of the slit SLT and a distance L2 from the tip of the slit SLT to the end P2 of the insulating layer 106, distance L2 from the tip of the slit SLT from the end P2 of the insulating layer 106 to the tip P1 of the slit SLT, and a distance L3 from the tip P1 of the slit SLT to the slit CEA become approximately equal.

By thus providing the slit CEA instead of the rib 104 and arranging the slit SLT and the insulating layer 106, an originating point P1 of the inclination operation of the liquid crystal molecules LQA due to distortion in electric field in the vicinity of the tip of the slit SLT and an originating point P2 of the inclination operation of the liquid crystal molecules LQA at the end of the insulating layer 106 are generated in different positions with respect to the X-direction, as in the case of the liquid crystal display apparatus 1 according to the first embodiment.

In the liquid crystal display apparatus according to the present embodiment, the tip P1 from which the slit SLT extends and the edge P2 of the insulating layer 106 are arranged in this order toward the edge of the pixel electrode PE from the position in which the slit CEA is arranged, with respect to the X-direction.

Accordingly, the inclination operation of the liquid crystal molecules propagates from the tip P1 of the slit SLT and the edge P2 of the insulating layer 106, as well as from the edge of the pixel electrode PE and the end of the slit CEA. Accordingly, the distance between the originating points of the inclination operation propagation of the liquid crystal molecules LQA can be decreased.

As a result thereof, as shown by the arrows in FIG. 15, the inclination operation of the liquid crystal molecules LQA propagates throughout the display pixel PX from the originating point of the inclination operation propagation of the liquid crystal molecules LQA, and the response time of the liquid crystal molecules LQA is decreased.

Conventionally, when the tone varies in the case where the slit SLT and the insulating layer 106 are not provided, the maximum value of the response time of the liquid crystal molecules LQA was approximately 200 ms. By providing the slit SLT and the insulating layer 106 as described above, the maximum value of the response time of the liquid crystal molecules LQA when the tone varies has been improved to less than or equal to approximately 100 ms.

That is, according to the liquid crystal display apparatus 1 of the present embodiment, as in the case of the above-described liquid crystal display apparatus 1 of the first embodiment, delay in time required for response propagation of the liquid crystal molecules is improved, and a liquid crystal display apparatus excellent in display qualities can be provided.

Next, a liquid crystal display apparatus according to the seventh embodiment of will be described with reference to the accompanying drawings. A liquid crystal display apparatus 1 according to the present embodiment comprises an array substrate 101 and an opposite substrate 102, as in the case of the liquid crystal display apparatus 1 according to the above-described first embodiment. In the liquid crystal display apparatus 1 according to the present embodiment, configuration of an opposite electrode CE and an insulating layer 106 are different from that of the above-described liquid crystal display apparatus 1 according to the first embodiment.

Figure 16:
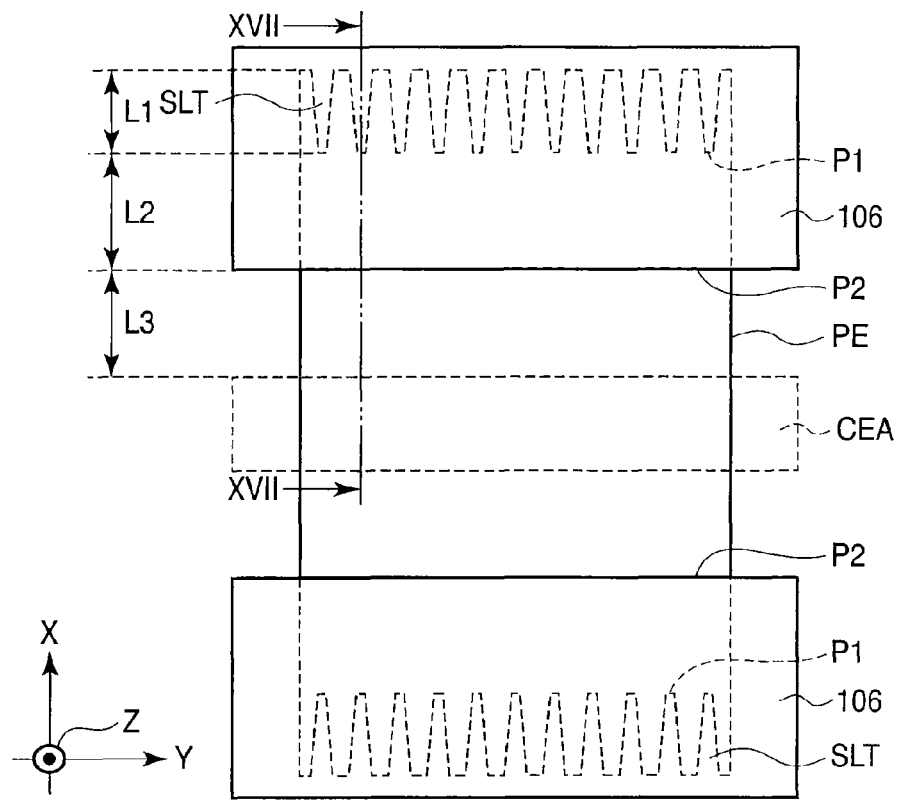
FIG. 16 illustrates a configuration example of a display pixel of a liquid crystal display apparatus according to a seventh embodiment.
Figure 17:
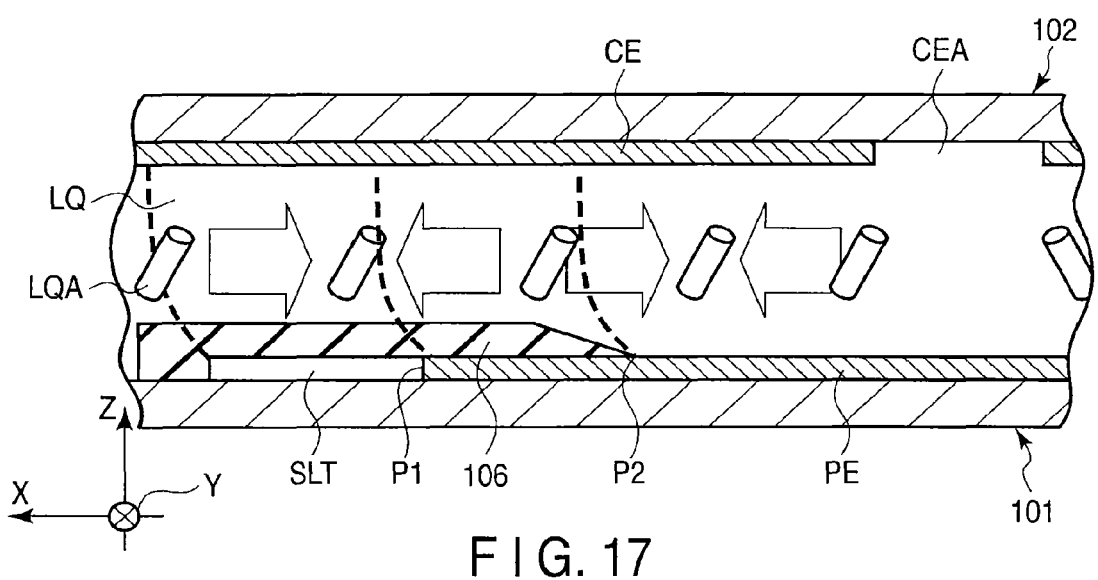
FIG. 17 illustrates an example of a cross section along line XVII-XVII in FIG. 16.

FIGS. 16 and 17 schematically show a configuration example of a display pixel of the liquid crystal display apparatus 1 according to the present embodiment. The array substrate 101 includes a pixel electrode PE and an insulating layer 106 arranged on the pixel electrode PE.

The pixel electrode PE includes a plurality of slits SLT extending in the X-direction from an edge extending in a direction (Y-direction) approximately crossing its longitudinal direction (X-direction). An insulating layer 106 is arranged on the slit SLT of the pixel electrode PE. The insulating layer 106 covers the edge of the pixel electrode PE in which the slits SLT are provided and the slits SLT.

In the present embodiment, the opposite substrate 102 does not include a rib. The opposite electrode CE includes a slit CEA from which the electrode is removed so as to extend in the Y-direction in a position facing the pixel electrode PE. The slit CEA is formed when the opposite electrode CE is patterned.

The insulating layer 106 is arranged on the opposite electrode CE so as to cover the slit CEA. The end of the insulating layer 106 is configured such that its thickness (width in the Z-direction) gradually decreases in the X-direction.

In the case shown in FIG. 15, the end of the insulating layer 106 varies in thickness such that the inclination surface (surface contacting the liquid crystal layer LQ via an orientation film) forms an acute angle in a clockwise direction with respect to the substrate surface of the opposite substrate 102.

In the present embodiment, an end P2 of the insulating layer 106 arranged on the opposite electrode CE is positioned in a region between a position of the edge P1 to which the slit SLT extends and a position of the edge extending in the Y-direction of the slit CEA.

The slit CEA, the slit SLA, and the insulating layer 106 are arranged such that a distance L1 from the edge of the pixel electrode PE along the Y-direction to the tip P1 of the slit SLT, a distance L2 from the tip of the slit SLT to tee end P2 of the insulating layer 106, and a distance L3 from the tip P1 of the slit SLT to the slit CEA become approximately equal.

By thus providing the slit CEA and arranging the slit SLT and the insulating layer 106, an originating point P1 of the inclination operation of the liquid crystal molecules LQA due to distortion in electric field in the vicinity of the tip of the slit SLT and an originating point P2 of the inclination operation of the liquid crystal molecules LQA at the end of the insulating layer 106 are generated in different positions in the X-direction, as in the case of the liquid crystal display apparatus 1 according to the first embodiment.

In the liquid crystal display apparatus according to the present embodiment, the edge P2 of the insulating layer 106 and the tip P1 from which the slit SLT extends are arranged in this order toward the edge of the pixel electrode PE from the position in which the slit CEA is arranged, with respect to the X-direction.

Accordingly, the inclination operation of the liquid crystal molecules propagates from the tip P1 of the slit SLT and the edge P2 of the insulating layer 106, as well as from the edge of the pixel electrode PE and the end of the slit CEA. Accordingly, the distance between the originating points of the inclination operation propagation of the liquid crystal molecules LQA can be decreased.

As a result thereof, as shown by the arrows in FIG. 17, the inclination operation of the liquid crystal molecules LQA propagates throughout the display pixel PX from the originating point of the inclination operation propagation of the liquid crystal molecules, and the response time of the liquid crystal molecules LQA is decreased.

Conventionally, when the tone varies in the case where the slit SLT and the insulating layer 106 are not provided, the maximum value of the response time of the liquid crystal molecules LQA was approximately 200 ms. By providing the slit SLT and the insulating layer 106 as described above, the maximum value of the response time of the liquid crystal molecules LQA when the tone varies has been improved to less than or equal to approximately 100 ms.

That is, according to the liquid crystal display apparatus 1 of the present embodiment, as in the case of the above-described liquid crystal display apparatus 1 of the first embodiment, delay in time required for response propagation of the liquid crystal molecules is improved, and a liquid crystal display apparatus excellent in display qualities can be provided.

Next, a liquid crystal display apparatus according to the eighth embodiment will be described with reference to the accompanying drawings. A liquid crystal display apparatus 1 according to the present embodiment comprises an array substrate 101 and an opposite substrate 102, as in the case of the liquid crystal display apparatus 1 according to the above-described first embodiment. In the liquid crystal display apparatus 1 according to the present embodiment, configuration of an opposite electrode CE and an insulating layer 106 are different from that of the above-described liquid crystal display apparatus 1 according to the first embodiment.

FIGS. 18 and 19 schematically show a configuration example of a display pixel of the liquid crystal display apparatus 1 according to the present embodiment. The array substrate 101 includes a pixel electrode PE and an insulating layer 106 arranged on the pixel electrode PE.

The pixel electrode PE includes a plurality of slits SLT extending in the X-direction from an edge extending in a direction (Y-direction) approximately crossing its longitudinal direction. The insulating layer 106 is arranged on the pixel electrode PE. The insulating layer 106 covers the edge of the pixel electrode PE in which the slits SLT are provided.

In the present embodiment, a tip to which the slit SLT extends is arranged in a region between a position of the end of the insulating layer 106 arranged on the pixel electrode PE and a position in which the rib 104 is arranged. The end of the insulating layer 106 arranged on the pixel electrode is configured such that its thickness (width in the Z-direction) gradually decreases in the X-direction.

In the case shown in FIG. 19, the end of the insulating layer 106 and the end of the rib 104 vary in thickness such that the inclination surface (surface contacting the liquid crystal layer LQ via an orientation film) forms an acute angle in a clockwise direction with respect to the substrate surface of the opposite substrate 102.

In the liquid crystal display apparatus 1 of the present embodiment, the opposite substrate 102 does not include a rib. The opposite electrode CE includes a slit CEA from which the electrode is removed so as to extend in the Y-direction in the position facing the pixel electrode PE. The slit CEA is formed when the opposite electrode CE is patterned.

The slit CEA, the slit SLA, and the insulating layer 106 are arranged such that a distance L1 from the edge of the pixel electrode PE along the Y-direction to the tip P1 of the slit SLT is approximately double a distance L2 from the tip of the slit SLT to the end P2 of the insulating layer 106, and a difference (L1–L2) between distance L1 and distance L2, distance L2 from the tip of the slit SLT from the end P2 of the insulating layer 106 to the tip P1 of the slit SLT, and a distance L3 from the tip P1 of the slit SLT to the slit CEA become approximately equal.

By thus providing the slit CEA instead of the rib 104 and arranging the slit SLT and the insulating layer 106, an originating point P1 of the inclination operation of the liquid crystal molecules LQA due to distortion in electric field in the vicinity of the tip of the slit SLT and an originating point P2 of the inclination operation of the liquid crystal molecules LQA at the end of the insulating layer 106 are generated in different positions in the X-direction, as in the case of the liquid crystal display apparatus 1 according to the first embodiment.

In the liquid crystal display apparatus according to the present embodiment, the tip P1 to which the slit SLT extends and the edge P2 of the insulating layer 106 are arranged in this order toward the edge of the pixel electrode PE from the position in which the slit CEA is arranged, with respect to the X-direction.

Accordingly, the inclination operation of the liquid crystal molecules propagates from the tip P1 of the slit SLT and the edge P2 of the insulating layer 106, as well as from the edge of the pixel electrode PE and the end of the slit CEA. Accordingly, the distance between the originating points of the inclination operation propagation of the liquid crystal molecules LQA can be decreased.

As a result thereof, as shown by the arrows in FIG. 19, the inclination operation of the liquid crystal molecules LQA propagate throughout the display pixel PX from the originating point of the inclination operation propagation of the liquid crystal molecules, and the response time of the liquid crystal molecules LQA is decreased.

Conventionally, when the tone varies in the case where the slit SLT and the insulating layer 106 are not provided, the maximum value of the response time of the liquid crystal molecules LQA was approximately 200 ms. By providing the slit SLT and the insulating layer 106 as described above, the maximum value of the response time of the liquid crystal molecules LQA when the tone varies has been improved to less than or equal to approximately 100 ms.

That is, according to the liquid crystal display apparatus 1 of the present embodiment, as in the case of the above-described liquid crystal display apparatus 1 of the first embodiment, delay in time required for response propagation of the liquid crystal molecules is improved, and a liquid crystal display apparatus excellent in display qualities can be provided.

The present invention is not limited to the above-described embodiments, and may be embodied by modifying the structural elements within the scope of the invention. For example, in the liquid crystal display apparatus according to the first to fourth embodiments, two steps are formed on the surface of the opposite substrate 102 by the rib 104 and the insulating layer 106, which are insulating materials with different thicknesses, but further steps may be provided between the edge of the rib 104 and the end of the insulting layer 106 by stacking two or more insulating layers.

In that case, the newly provided end of the insulating layers is formed so as to gradually decrease in thickness. Thereby, the end becomes an originating point for inclination operation propagation of the liquid crystal molecules LQA, and the response time of the liquid crystal molecules LQA when the tone varies is improved. Further, various inventions can be formed by appropriately combining the structural elements disclosed in the embodiments. For example, some of the constituent elements disclosed in the embodiments may be deleted. Moreover, constituent elements according to different embodiments may be combined as appropriate.

For example, a polymer sustened alignment (PSA) technique of mixing a monomer that can be polymerized by light or heat into liquid crystals, polymerizing the monomer in a state in which the liquid crystal molecules are inclined by applying a voltage, and storing the inclination direction of the liquid crystal molecules may be combined with the above-described embodiments. According to the PSA technique, since the polymerized film that stores the inclination of the liquid crystal molecules is formed in an interface between the liquid crystals and the orientation film, a strong orientation control power is obtained, and the orientation direction of the liquid crystal molecules is defined in advance. It is therefore effective for improvement in response time to combine this technique with the above-described embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display apparatus, comprising:
a first substrate;
a first electrode;
a second substrate;
a second electrode facing the first electrode; and
a liquid crystal layer interposed between the first substrate and the second substrate, wherein
an edge portion of the first electrode includes a plurality of protrusions and a plurality of first slits between the plurality of protrusions,
the first slit extends in a first direction,
the plurality of protrusions are arranged in a second direction crossing the first direction, and
a shape of the plurality of protrusions is a taper shape.

2. The liquid crystal display apparatus according to claim 1, further comprising:
an insulating layer located between the first electrode and the second electrode, and
a second slit, in which the second electrode is not formed, located adjacent to the second electrode.

3. The liquid crystal display apparatus according to claim 2, wherein an end of the insulating layer is positioned closer to the second slit than a tip of said plurality of first slits, in the first direction.

4. The liquid crystal display apparatus according to claim 3, wherein a distance from the edge portion of the first electrode to the tip of said plurality of first slits, a distance from the tip of the first slit to the end of the insulating layer, and a distance from the end of the insulating layer to an end of the second slit are equal, in the first direction.

5. The liquid crystal display apparatus according to claim 2, wherein a tip of said plurality of first slits is positioned closer to the second slit than an end of the insulating layer in the first direction.

6. The liquid crystal display apparatus according to claim 5, wherein a distance from the edge portion of the first electrode to the end of the insulating layer, a distance from the end of the insulating layer to the tip of the first slit, and a distance from the tip of the first slit to an end of the second slit are equal, in the first direction.

7. The liquid crystal display apparatus according to claim 1, wherein the liquid crystal layer is formed of a liquid crystal material having negative dielectric constant anisotropy.

8. The liquid crystal display apparatus according to claim 1, wherein the shape of the protrusions is a trapezoid.

9. The liquid crystal display apparatus according to claim 1, wherein the first direction is substantially orthogonal to the second direction.

10. The liquid crystal display apparatus according to claim 2, wherein the insulating layer overlaps with the plurality of protrusions and the plurality of first slits.

11. The liquid crystal display apparatus according to claim 2, wherein the second slit overlaps with the first electrode.

12. The liquid crystal display apparatus according to claim 2, wherein a length of the second slit in the second direction is longer than a length of the second slit in the first direction.

13. The liquid crystal display apparatus according to claim 1, wherein the first electrode includes a first region formed with the plurality of the protrusions and a second region not formed with the plurality of the protrusions, and
- a length of the first region in the first direction is longer than a length of the second region in the first direction.

14. The liquid crystal display apparatus according to claim 1, wherein the first electrode includes a first region formed with the plurality of the protrusions and a second region not formed with the plurality of the protrusions, and
- a length of the second region in the second direction is longer than a length of the second region in the first direction.

15. The liquid crystal display apparatus according to claim 1, wherein a response time of a liquid crystal molecular is 100 (ms) or less.

16. The liquid crystal display apparatus according to claim 1, wherein the first direction is a longitudinal direction of the first electrode.

17. The liquid crystal display apparatus according to claim 1, wherein the first electrode is a pixel electrode and the second electrode is a common electrode.

18. The liquid display apparatus according to claim 1, wherein
- the first direction is a direction orthogonal to the second direction.

19. The liquid display apparatus according to claim 1, wherein
- a total length of the plurality of protrusions and the plurality of first slits in the second direction is larger than a length of one of the protrusions in the first direction.

20. The liquid display apparatus according to claim 1, wherein
- an entire of one of the protrusions tapers gradually.

* * * * *